United States Patent [19]

Fitzner et al.

[11] Patent Number: 4,779,454

[45] Date of Patent: Oct. 25, 1988

[54] CRANKSHAFT ANGLE SENSING SYSTEM

[75] Inventors: Arthur O. Fitzner; William D. Harmer, both of Fond du Lac, Wis.

[73] Assignee: Brunswick Corp., Skokie, Ill.

[21] Appl. No.: 119,789

[22] Filed: Nov. 12, 1987

[51] Int. Cl.$^4$ ............................................. G01M 15/00
[52] U.S. Cl. .................................. 73/116; 123/149 D; 310/153
[58] Field of Search ............................. 73/116; 322/99; 310/49 R, 67 R, 153, 156, 158, 159; 123/149 D

[56] References Cited

U.S. PATENT DOCUMENTS

| | | | |
|---|---|---|---|
| 2,945,138 | 7/1960 | Strang | 310/153 |
| 3,105,474 | 10/1963 | Kiekhaefer | 123/59 |
| 3,504,208 | 3/1970 | Rivers | 310/156 |
| 3,535,571 | 10/1970 | Heinzen | 310/158 |
| 3,541,363 | 11/1970 | Vettermann et al. | 310/49 |
| 3,549,925 | 12/1970 | Johnson | 310/168 |
| 3,868,521 | 2/1975 | Schlicker et al. | 310/275 |
| 3,937,200 | 2/1976 | Sleder et al. | 123/148 CC |
| 4,074,157 | 2/1978 | Lace | 310/67 R |
| 4,093,906 | 6/1978 | Draxler | 322/51 |
| 4,636,671 | 1/1987 | Terada | 310/153 X |

Primary Examiner—Jerry W. Myracle
Attorney, Agent, or Firm—Andrus, Sceales, Starke & Sawall

[57] ABSTRACT

An annular permanent magnet rotor (8) is mounted around and fixed to a crankshaft (4) of an internal combustion engine (2) and has a plurality of circumferentially spaced magnetic poles (14) of sequentially alternating north-south polarity type, and a pole (18) reversed out of the alternating sequence. A first fixed stator (24) is provided by an annular ring concentric to the rotor (8) and has a plurality of poles (26) for magnetic flux coupling with the permanent magnet rotor poles (14). A second fixed stator (48) is axially spaced from the first stator (24) and has a pair of poles (50, 52) for magnetic flux coupling with the rotor (8). A first sensor coil (40) around the first stator (24) outputs a timing angle signal. Processing circuitry produces a series of digital pulses having ANGLE-defining edges occurring at fixed angular increments of crankshaft rotation. A second sensor coil (56) around the second stator (48) outputs an advance warning signal that a specific REFERENCE ANGLE-defining edge is about to appear in the series of digital pulses produced from the first sensor coil's output.

19 Claims, 4 Drawing Sheets

CRANKSHAFT ANGLE SENSING SYSTEM

BACKGROUND

The present invention relates to a magnetic pick-up detector arrangement for dynamically sensing crankshaft angular position in an internal combustion engine. The system senses a single top dead center or other angular reference position for each revolution, and senses numerous other equiangularly-spaced positions during each revolution. The system arose during development efforts relating to microprocessor based ignition timing and like control systems for marine engines.

SUMMARY

Crankshaft angle sensing apparatus operable over a range of engine speeds divides each crankshaft rotation into an even number of equal parts, with the dividing transition between a selected pair of such parts being separately identified for absolute angular reference purposes. An annular permanent magnet rotor 8 is concentrically fixed to the hub 10 of the flywheel 6 which is mounted in fixed angular relationship to the crankshaft 4 of an internal combustion engine 2. Annular permanent magnet rotor 8 has a plurality of circumferentially spaced magnetic poles 14 of sequentially alternating north-south polarity, with one pole 18 reversed out of the alternating sequence and magnetically merged into the immediately adjacent poles 20, 22. A first stator 24 provided by an annular ring settably fixed to the engine 2 and concentric to the rotor 8 has a plurality of magnetically permeable poles 26 equal in number to the total number of permanent magnet rotor poles 14 including the reversed pole 18 and angularly spaced to gather the maximum amount of magnetic flux from the majority of the permanent magnet rotor poles 14. A second stator 48 fixed in axial and angular spacing relative to the first stator 24 has a pair of magnetically permeable poles 50, 52 angularly spaced at approximately twice the angular spacing of permanent magnet poles 14 to gather the minimum amount of magnetic flux from the majority of the permanent magnet rotor poles 14. As crankshaft 4, flywheel hub 10 and permanent magnet rotor 8 rotate through each complete revolution, a first sensor coil 40 around first stator 24 generates an alternating signal 40b comprised of a plurality of electrical alternations each containing two electrical half-cycles of output voltage, and a second sensor coil 56 around the second stator 48 generates an alternating signal 56c that appears only once during each revolution. Generated by first sensor coil 40 and subsequently processed by filter network 65 and squaring amplifier 66, processed signal 40d represents one complete revolution of the crankshaft 4 divided into a plurality of equal angular increments, the number of such angular increments being identical to both the number of poles 26 on the first stator 24 and the number of electrical half-cycles of output voltage from the first sensor coil 40. Generated by second sensor coil 56 and subsequently processed by filter network 69 and comparator 70, processed signal 56e provides advance warning that the dividing transition between the selected pair of angular increments, representing the absolute angular reference, is about to appear.

DETAILED DESCRIPTION

Figure 1:
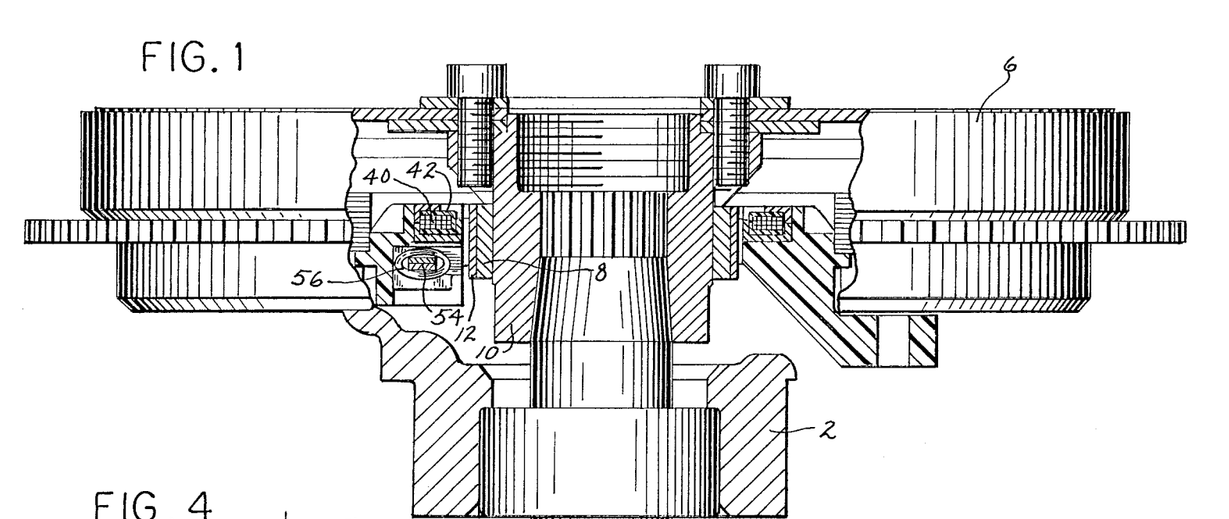
FIG. 1 is a side view partially in section of a crankshaft angle sensing system in accordance with the invention.

FIG. 1 shows a portion of a marine internal combustion engine 2 having a vertical rotary crankshaft 4 carrying a flywheel 6 at its upper end, all as is well known in the art, for example U.S. Pat. Nos. 2,945,138, 3,105,474, 3,937,200, and 4,093,906 incorporated by reference. In accordance with the invention, an annular permanent magnet rotor 8 is mounted around flywheel hub 10, which is in turn fixed to the crankshaft to rotate therewith. Rotor 8 is a magnetized flexible member compressed between nonmagnetic sleeve 12 and hub 10 which causes rotor 8 to be fixed to hub 10 and to rotate therewith.

Figure 2:
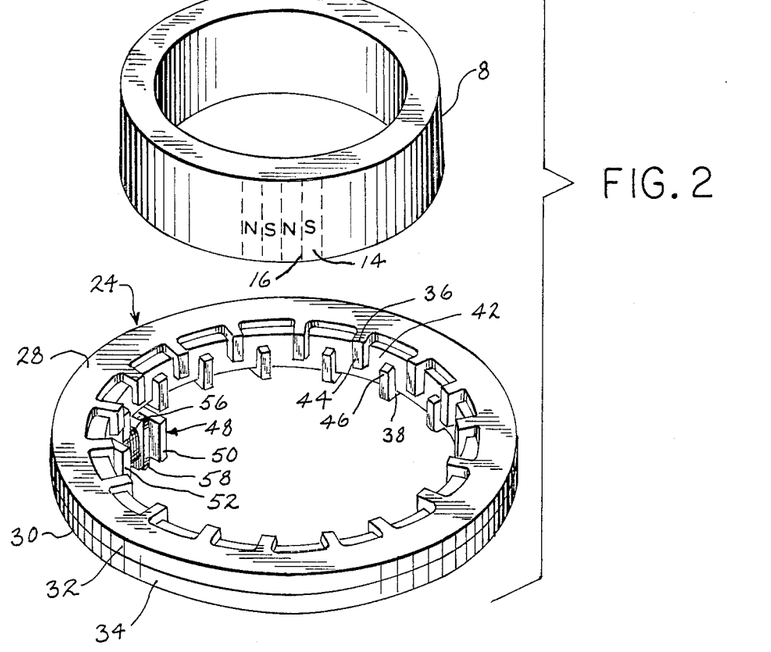
FIG. 2 is an exploded isometric view of a portion of the structure in FIG. 1.
Figure 3:
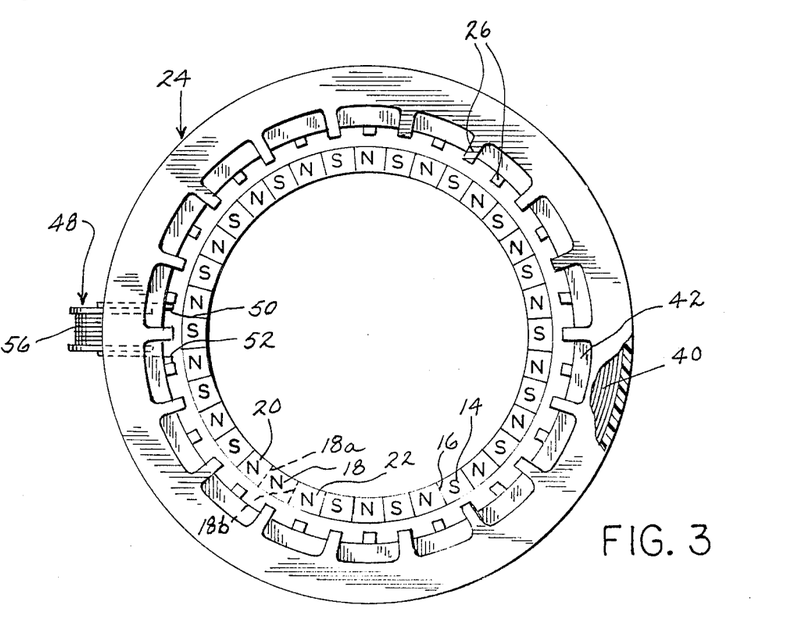
FIG. 3 is a top plan view of the structure of FIG. 2.

As shown in FIGS. 2 and 3, rotor 8 has a plurality of circumferentially spaced magnetic poles of sequentially alternating north-south polarity type defining a plurality of north-south pole borders spaced by the width of the poles. As shown in FIG. 2, the poles such as 14 are strips which extend axially along rotor 8 parallel to the axis of rotation of the crankshaft and rotor. Pole borders such as 16 likewise extend axially along rotor 8. Each pole subtends an arc of given angular rotation of the crankshaft. One of the poles is reversed out of the alternating sequence to provide a pole 18, FIG. 3, of one polarity type between adjacent poles 20 and 22 of the same one polarity type, eliminating two pole borders which would otherwise be present at 18a and 18b. As shown in FIG. 3, the pole reversal provides three contiguous north poles 20, 18 and 22, with no zones of demarcation therebetween.

Figure 4:
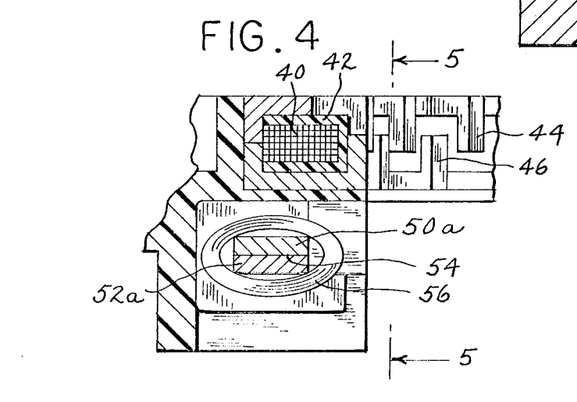
FIG. 4 is an enlarged view of a portion of the structure of FIG. 1.
Figure 5:
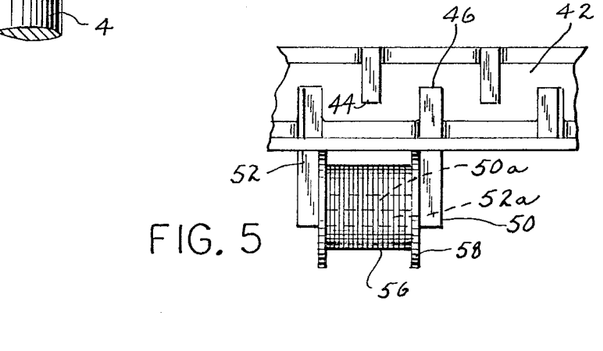
FIG. 5 is a view taken along line 5-5 of FIG. 4.

A stator 24, FIGS. 2 and 3, is provided by an annular ring settably mounted to the engine and concentric to rotor 8. Stator 24 has a plurality of poles such as 26, FIG. 3, spaced for maximum magnetic flux coupling with the permanent magnet rotor poles. Stator 24 is formed by a pair of distal side faces 28 and 30 axially spaced apart along a direction parallel to the axis of rotation of the crankshaft and rotor. The side faces are joined at their outer peripheries by respective circumferential end faces 32 and 34. Side face 28 has a plurality of fingers 36 extending radially inwardly toward rotor 8 and providing half of the poles of stator 24. Side face 30 has a plurality of fingers 38 extending radially inwardly toward rotor 8 and providing the other half of the poles of stator 24. A sensor coil 40, FIGS. 3 and 4, is wound circumferentially between side faces 28 and 30. The coil is wound on a bobbin 42. Fingers 36 have portions 44 which extend axially toward side face 30 and engage bobbin 42. Fingers 38 have portions 46 which extend axially toward side face 28 and engage bobbin 42.

In the preferred embodiment, rotor 8 has 36 equally circumferentially spaced poles, including reversed pole 18. Each pole subtends an arc of 10° of crankshaft rotation. Rotor 8 has 34 north-south pole boundaries such as 16. Stator 24 has 36 equally circumferentially spaced poles.

Another stator 48, FIG. 2, is provided by a U-shaped member mounted in a fixed relationship to stator 24 and having a pair of legs 50 and 52 having ends facing and proximate rotor 8 and providing a pair of poles. Legs 50 and 52 are L-shaped and have overlapped portions 50a and 52a forming the central bight 54 of the U. A sensor coil 56 is wound on bobbin 58 on bight 54. In the preferred embodiment, the poles on legs 50 and 52 of stator 48 are spaced by two rotor pole widths, i.e 20°.

Figure 7:
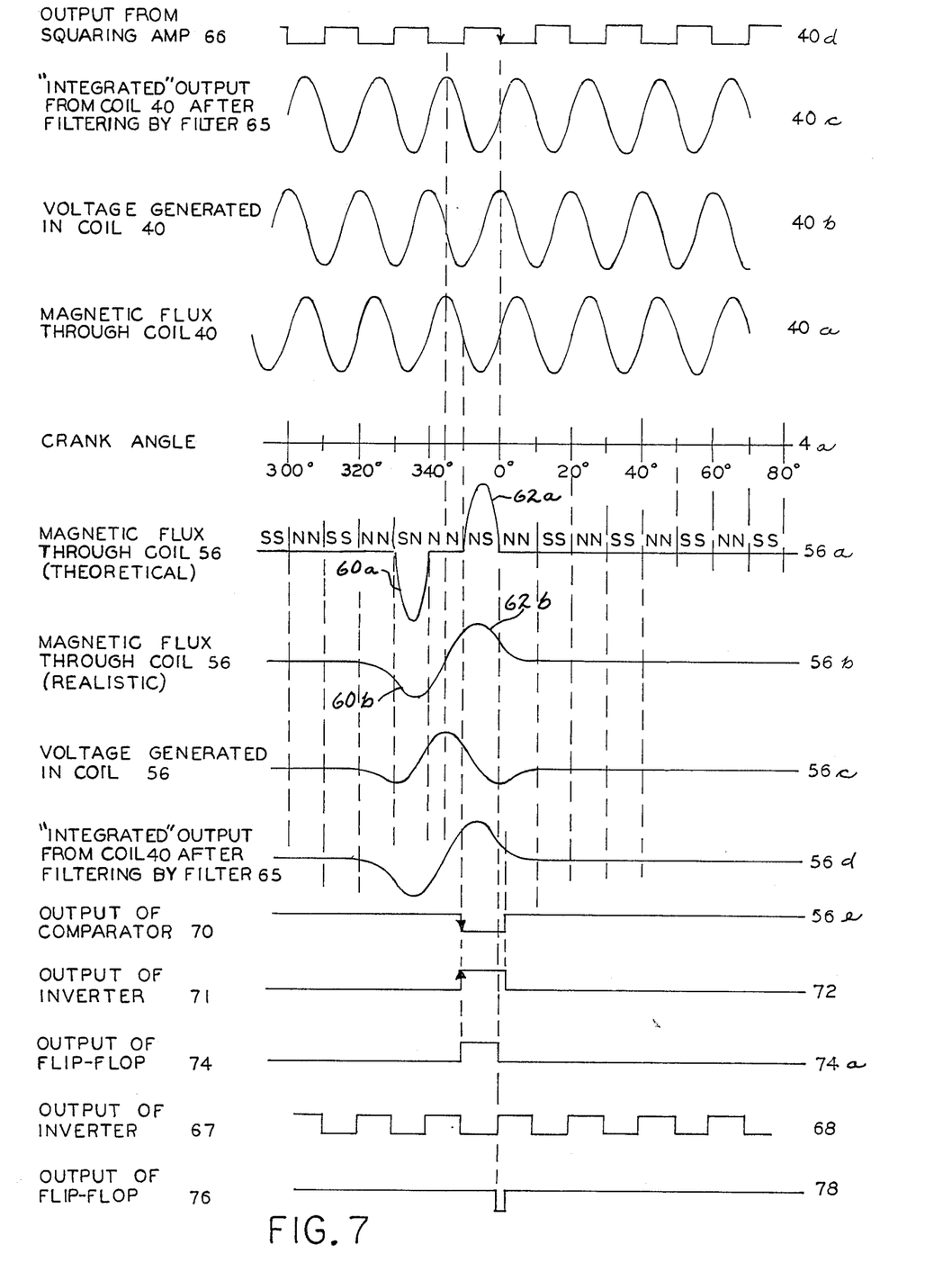
FIG. 7 is a timing diagram illustrating the basic principle underlying operation of the invention.

Referring to FIG. 7, baseline 4a shows the angular position of the crankshaft 4, and waveform 40a shows the instantaneous value of the net magnetic flux linking with stator coil 40, as the intersecting time line moves from left to right. Since there are 36 permanent magnet poles on rotor 8, and 36 magnetically permeable poles 26 on stator 24, for each revolution of crankshaft 4 there would be 36 half-cycles of net magnetic flux linking with coil 40. The presence of reversed pole 18 merely reduces the maximum value of the net magnetic flux from 36 units of flux to 34 units of flux, a reduction of about 6%. Theoretically, were it not for the eddy-current and hysteresis and coil current magnetic reaction effects in the magnetic flux paths provided by stator 24, the magnitude and phase of waveform 40a in relation to baseline 4a would remain constant for all rotational speeds of the crankshaft.

Waveform 40b in FIG. 7 represents the voltage generated in the coil 40 as the crankshaft rotates. Waveform 40b is proportional to the derivative of waveform 40a with respect to time, in accordance with the equation $E = Nd\theta/dt$. Theoretically, were it not for the eddy current and hysteresis and coil current magnetic reaction effects that disturb waveform 40a, the magnitude of waveform 40b would increase linearly with the rotational speed of the crankshaft.

Figure 8:
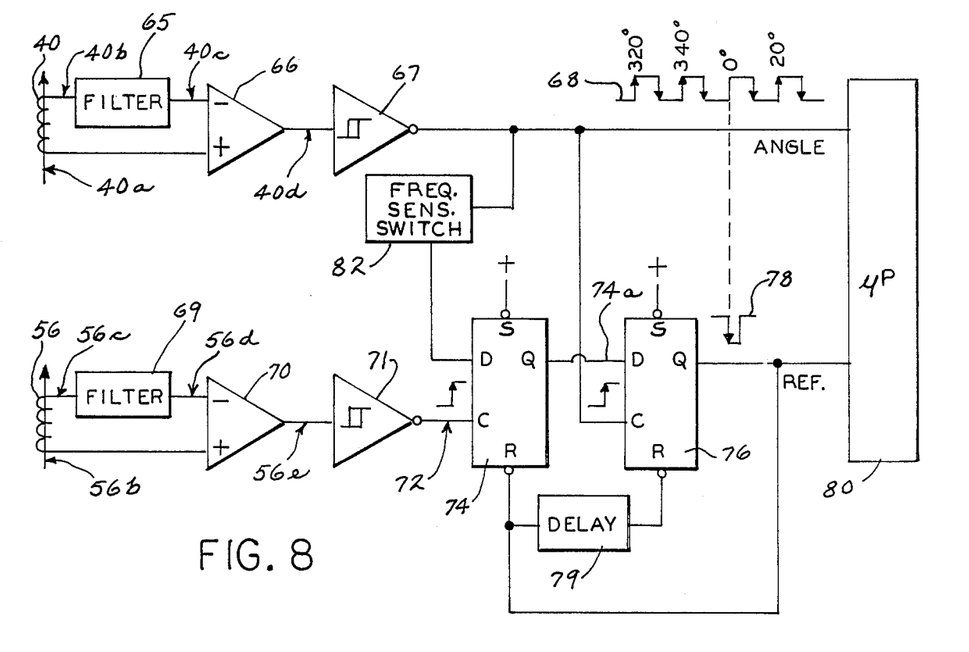
FIG. 8 is circuit diagram showing circuitry in accordance with the invention.

Theoretically, waveform 40c in FIG. 7 should represent the approximate time integral of waveform 40b, as obtained by passing waveform 40b through a suitable long RC time constant filter network 65, as illustrated in FIG. 8. Waveform 40c would not have the large magnitude variations with rotational speed that are observed with waveform 40b. Theoretically, waveform 40c would then closely resemble waveform 40a over a wide range of rotational speed, and thus, were it not for eddy currents and hysteresis and coil current magnetic reaction effects acting to disturb waveform 40a, the magnitude and phase of waveform 40c would maintain a constant amplitude and phase relationship with baseline 4a over a similar wide range of speed.

Waveform 40d in FIG. 7 shows the output of squaring amplifier 66, as illustrated in FIG. 8, in response to the application of waveform 40c to its inverting input. Squaring amplifier circuits are well known and a complete circuit is therefor not shown in FIG. 8. As known in the art, squaring amplifier 66 is provided with a small amount of hysteresis. Squaring amplifier 66 can be conveniently constructed with an RCA CA3130A operational amplifier. Theoretically, waveform 40d would maintain a constant phase relationship with baseline 4a over a wide range of speed. Waveform 40d has 36 ANGLE-defining edge transitions in each crankshaft revolution, with the edges occurring at precise 10 degree intervals. The 36 ANGLE-defining edges of waveform 40d divide each revolution of crankshaft 4 into 36 equal parts. One of the ANGLE-defining edges is designated as the REFERENCE ANGLE-defining edge.

Figure 9:
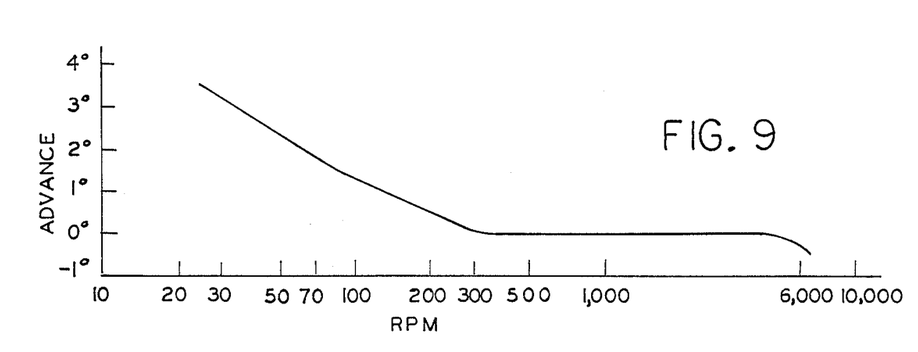
FIG. 9 is a graph of sensed angle versus rpm.

From a practical standpoint, since eddy current, hysteresis and coil current magnetic reaction effects are present and act to disturb waveform 40a, the characteristics of an optimum filter network 65 differ from those of a perfect integrator over the operating speed range. In a preferred embodiment, filter 65 is designed as an RC lag/lead/lag network, in order to optimize the phase stability of waveforms 40c and 40d relative to crankshaft angle baseline 4a over the operating speed range of the engine. FIG. 9 illustrates the remarkable stability of the ANGLE-defining edges obtained thereby, particularly through the speed range from 300 to 5000 rpm.

Again referring to FIG. 7, baseline 4a shows the angular position of crankshaft 4. Waveform 56a shows the theoretical instantaneous value of the magnetic flux passing through coil 56 on stator 48, as the time line moves from left to right. Since the two poles 50 and 52 of the stator 48 are spaced 20 degrees apart, the majority of the permanent magnet poles 14 on rotor 8 produce very little magnetic flux passing through coil 56. Only permanent magnet pole pair 18 and 19 and pole pair 18 and 23 can produce appreciable magnetic flux through coil 56. The negative half-cycle of flux 60a in waveform 56a theoretically reaches its peak value when rotor poles 19 and 18 are aligned with stator poles 50 and 52, respectively. When the rotor has turned an additional 20 degrees from that position, that is, when rotor poles 18 and 23 are aligned with stator poles 50 and 52, respectively, waveform 56a theoretically reaches the peak of its positive half cycle of flux 62a.

Figure 6:
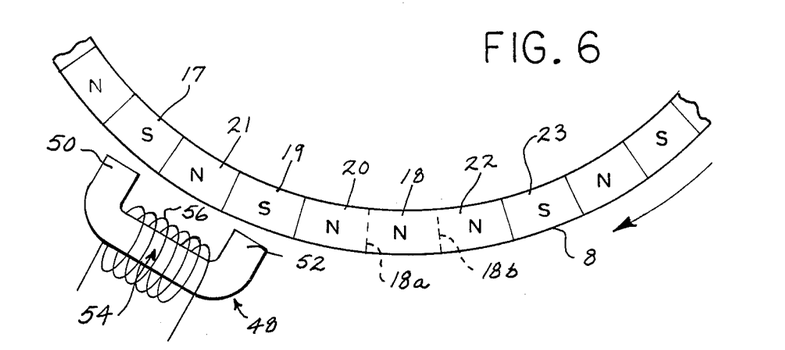
FIG. 6 is a schematic illustration of a portion of the structure in FIG. 3.

In the position shown in FIG. 6, corresponding to 315° in FIG. 7, poles 50 and 52 of stator 48 are aligned with respective south poles 17 and 19, and hence there is no magnetic flux therebetween and no flux through coil 56. After 10° of rotation, i.e. at 325°, poles 50 and 52 are aligned with respective north poles 21 and 20 on rotor 8, and again there is no magnetic flux through coil 56. After another 10° of rotation, i.e. at 335°, poles 50 and 52 will now be aligned with respective opposite polarity south and north poles 19 and 18 of rotor 8. This is because of reversed pole 18 of rotor 8 which is north instead of south. The opposite magnetic polarities of rotor poles 19 and 18 direct and couple magnetic flux through stator 48 to complete a magnetic circuit, and induce a magnetic flux pulse as shown at 60a. After another 10° of rotation, i.e. at 345°, stator poles 50 and 52 are aligned with respective north rotor poles 20 and 22. After another 10° of rotation, i.e. at 355°, stator poles 50 and 52 are aligned with respective opposite polarity north and south rotor poles 18 and 23. This is again due to reversed rotor pole 18. The opposite magnetic polarities of rotor poles 18 and 23 direct and couple magnetic flux through stator 48 to complete a magnetic circuit and induce a magnetic pulse as shown at 62a.

Waveform 56b, containing negative flux excursion 60b and positive flux excursion 62b, shows a more realistic plot of the flux passing through stator coil 56 as a function of crankshaft angle. Magnetic flux fringing effects account for the difference between theoretical waveform 56a and more realistic waveform 56b. Theoretically, were it not for the eddycurrent and hysteresis and coil current magnetic reaction effects in the flux path provided by stator 48, the magnitude and phase of waveform 56b in relation to baseline 4a would remain constant for all rotational speeds of the crankshaft.

Waveform 56c represents the voltage generated in the coil 56 as the crankshaft rotates. Waveform 56c is proportional to the derivative of waveform 56b with respect to time, and therefor, were it not for the effects of eddy currents and hysteresis and coil current magnetic reaction, the magnitude of waveform 56c would theoretically increase linearly with the rotational speed of the crankshaft.

Theoretically, waveform 56d should represent the approximate integral of waveform 56c, as obtained by passing waveform 56c through long RC time constant filter network 69. Waveform 56d would not have the large magnitude variations with rotational speed that are observed with waveform 56c. Theoretically, waveform 56d would closely resemble waveform 56b over a wide range of rotational speed, and thus, were it not for eddy current, hysteresis and coil current magnetic reaction effects acting to disturb waveform 56b, the magnitude and phase of waveform 56d would maintain a constant amplitude and phase relationship with baseline 4a over a similar wide range of speed.

Waveform 56e shows the output of comparator 70, as illustrated in FIG. 8, in response to the application of waveform 56d to its inverting input. Comparator circuits are well known and a complete circuit is therefor not shown in FIG. 8. As known in the art, comparator 70 is provided with a small amount of hysteresis. Comparator 70 can be conveniently constructed with an RCA 3130A operational amplifier. Waveform 56e provides one advance warning edge transition in each crankshaft revolution, with the only critical requirement being that the warning edge transition must occur prior to the REFERENCE ANGLE-defining edge of waveform 40d, but not prior to the immediately preceeding ANGLE-defining edge having the same polarity as the REFERENCE ANGLE-defining edge. In the preferred embodiment having ANGLE-defining edge transitions every 10 degrees, ANGLE-defining edge transitions of the same polarity occur every 20 degrees. In order to provide proper warning, the warning edge of waveform 56e need only remain in an acceptable phase relation to the REFERENCE ANGLE-defining edge of waveform 40d throughout the cranking and running speed range of the engine. The band of acceptability on the phase relationship between the warning edge of waveform 56e and the REFERENCE ANGLE-defining edge of waveform 40d is almost 20 degrees wide.

From a practical standpoint, since eddy current, hysteresis and coil current magnetic reaction effects are present, the characteristics of an optimum filter network 69 might differ from those of a perfect integrator over the operating range. In the preferred embodiment, a simple RC low pass filter network has proven to be sufficient to maintain the warning edge of waveform 56e well within acceptable limits in respect to its phase relationship with the REFERENCE ANGLE-defining edge of waveform 40d.

In the preferred embodiment, stator poles 50 and 52 are spaced by an even number of rotor pole widths. In an alternative embodiment, stator poles 50 and 52 are spaced by an odd number of rotor pole widths. In this alternative, a sinusoidal voltage wave form is induced in coil 56 when the normal sequence of rotor poles is passing the poles of stator 48 because stator poles 50 and 52 will see opposite polarity magnetic poles of the rotor. When the reversed pole 18 passes stator 48, the stator poles 50 and 52 will see like polarity rotor poles, and hence there will be no voltage induced in coil 56. This absence of voltage is thus the signal indicating absolute position of the crankshaft relative to the engine. In each embodiment, coil 56 thus outputs a signal having a first characteristic when the normal sequence of rotor magnet poles is passing the poles of stator 48, and having a second characteristic when the reversed rotor pole 18 is passing the poles of stator 48.

Stators 24 and 48 are axially spaced from each other along a direction parallel to the axis of rotation of the crankshaft and rotor. Stator 24 is concentric to rotor 8 along one axially extending portion of the rotor. Stator 48 is proximate another axially extending portion of rotor 8, such that stators 24 and 48 share the same rotor. Stators 24 and 48 need not be axially aligned.

FIG. 8 illustrates the application of the invention in a preferred embodiment. To obtain faster edge transitions than those present in waveform 40d and to minimize the possiblity of load disturbances affecting the output of squaring amplifier 66, an inverter 67 having Schmitt trigger input characteristics is used to invert waveform 40d. The desired Schmitt trigger inverter characteristic can be conveniently obtained with a device such as an RCA CD74HC14. Waveform 68 shows the output of the inverter 67 driven by input waveform 40d. Waveform 68 has 36 ANGLE-defining edge transitions in each crankshaft revolution, with the edges occurring at precise 10 degree intervals. Inverter 71 is used to invert waveform 56e, thereby producing waveform 72. The advance warning edge transition is the positive-going edge of waveform 72. Inverter 71 can conveniently be obtained with a device such as the RCA CD74HC14.

In the preferred embodiment, waveform 72, as developed by inverter 71, drives the triggering input of positive-edge-triggered D-type flip-flop 74, a CD74HC74, which has its D input connected to the output of frequency sensitive switch 82. Frequency sensitive switch circuits are well known and a complete circuit is therefor not shown in FIG. 8. When the speed of rotation of the crankshaft exceeds a selected low value, indicating that the engine is either being cranked or is running, the frequency of waveform 68 supplying the input to frequency sensitive switch 82 becomes high enough to cause the output of frequency sensitive switch 82 to switch to a logic high voltage. When the positive-going advance warning edge of waveform 72 appears, flip-flop 74 is triggered, and with its D input held high by frequency switch 82, the Q output of flip-flop 74 goes high, as shown by waveform 74a. Flip-flop 74 thus effectively captures the advance warning edge and holds it as long as necessary, but only if the crankshaft speed is above the selected minimum level.

The Q output of flip-flop 74 is connected to the D input of positive-edge-triggered flip-flop 76, a CD74HC74, which is triggered by every positive-going ANGLE-defining edge of waveform 68. The negative-going ANGLE-defining edges of waveform 68 have no effect on flip-flop 76. Waveform 68 has 18 positive-going ANGLE-defining edges in each revolution of the crankshaft, but only the REFERENCE ANGLE-defining edge is preceded by the advance warning signal temporarily captured in flip-flop 74, that is, by a logic high signal on the D input of flip-flop 76. Consequently, flip-flop 76 drives its $\bar{Q}$ output low only once during each crankshaft revolution and then only when triggered by the REFERENCE ANGLE-defining edge transition of waveform 68.

Waveform 78 shows the output of flip-flop 76. When waveform 78 goes low, flip-flop 74, having performed its task, is immediately reset, and after a very short delay as provided by RC delay network 79, flip-flop 76 is also reset. Waveform 78 is therefor a negative-going pulse of short duration, with the leading edge of the pulse occurring almost simultaneously with the REFERENCE ANGLE-defining edge of waveform 68. The leading edge of waveform 78 is now taken to be the REFERENCE ANGLE-defining edge.

In one implementation, the invention is used in conjuction with a microprocessor 80 which controls ignition timing and fuel injection of the engine. Microprocessor 80 receives on its ANGLE input the waveform 68, with its 36 precise ANGLE-defining transitions in each crankshaft revolution. Microprocessor 80 receives on its REFERENCE input, which is driven by flip-flop 76, the once per revolution pulse waveform 78 containing the negative-going REFERENCE ANGLE-defining edge. In each revolution of the crankshaft, microprocessor 80 actively responds to the single REFERENCE ANGLE-defining edge provided by waveform 78, and to the subsequent 35 of the 36 ANGLE-defining edge transitions provided by waveform 68. From the standpoint of microprocessor 80, the REFERENCE ANGLE-defining edge of waveform 78 occurs essentially simultaneously with, and takes the place of, the ignored ANGLE-defining edge of waveform 68.

Microprocessor 80 actively responds to the various signal edge transitions appearing on its ANGLE and REFERENCE inputs by temporarily interrupting its current program execution in order to produce the appropriate programmed responses. When the REFERENCE ANGLE-defining edge transition of waveform 78 appears on the REFERENCE input, which occurs essentially simultaneously with an ANGLE-defining edge transition of waveform 68, the microprocessor would respond actively to the REFERENCE ANGLE-defining edge and would ignore the ANGLE-defining edge since the ANGLE input had been previously disabled. Part of the microprocessor's REFERENCE ANGLE response would be to enable the previously disabled ANGLE input, but this would not cause the microprocessor to recognize the previously ignored ANGLE-defining edge. Subsequently, for 34 of the ANGLE-defining edges appearing on the ANGLE input, the microprocessor would respond actively and would also prepare itself to take appropriate action upon receiving the next ANGLE-defining edge. Upon receiving the 35th ANGLE-defining edge, however, the microprocessor, as part of its 35th active response, would disable the ANGLE input from actively responding to any further ANGLE-defining edge transitions. The 36th ANGLE-defining transition of waveform 68 would therefor not elicit an active response from microprocessor 80. When the REFERENCE ANGLE-defining edge transition of waveform 78 appeared on the REFERENCE input, essentially simultaneously with the ignored 36th ANGLE-defining edge transition, the microprocessor would respond as previously described, thus allowing the process to repeat.

Overall, in the preferred application the microprocessor would respond in an active manner 36 times for each revolution of the crankshaft, with each response being effectively triggered by an ANGLE-defining edge transition of waveform 68, if not directly, then indirectly through the extremely short propagation delay of flip-flop 76, which is directly triggered by the positive-going ANGLE-defining edges of waveform 68.

Additionally in the preferred application, microprocessor 80 would respond in a non-active manner to every one of the ANGLE-defining edge transitions of waveform 68. None would be ignored. Within the microprocessor utilized in the preferred application, a continuously running 16-bit counter-timer subsystem is provided for making time measurements and for producing pulse widths based on time. Whenever an ANGLE-defining edge transition appears on the microprocessor's ANGLE input, an internal 16-bit subsystem register is updated with the then-existing 16-bit value in the running counter-timer, regardless of whether or not the ANGLE input is enabled. The instantaneous time at which the ANGLE-defining edge transition occurred would thus be captured in the register. Such time-based information is required in order for the microprocessor to carry out its real-time control functions.

In the preferred application of the invention, the ANGLE-defining edges of waveform 68 and the REFERENCE ANGLE-defining edge of waveform 78 are supplied to microprocessor 80 which controls ignition timing and fuel injection of the engine. In an alternative application, the advance warning pulse from comparator 70 could be supplied directly to the microcomparator processor 80 and would indicate that the next ANGLE-defining edge of waveform 68 is the REFERENCE ANGLE-defining edge for top dead center on number 1 cylinder or other reference position of the crankshaft. The subsequent ANGLE-defining edges of waveform 68 would then update the microprocessor every 10 degrees of crankshaft rotation, such that the microprocessor would be able to determine crankshaft position at 10 degree intervals during that revolution. In such an alternative application, the phase of the leading edge of the advance warning pulse 72 in relation to the REFERENCE ANGLE-defining edge would have to remain within a band less than 10 degrees wide. This reduction in the band of acceptance from less than 20 degrees wide in the preferred application to less than 10 degrees wide in the alternative application would complicate the design and manufacture of the mechanical and electronic components. Further, the required responses of the microprocessor 80 to the 36 ANGLE-defining edges of waveform 68 would become more complicated and time-consuming.

It is recognized that various equivalents, alternatives and modifications are possible within the scope of the appended claims.

We claim:

1. A crankshaft angle sensing system for an internal combustion engine having a rotary crankshaft comprising:
   a permanent magnet rotor mounted for rotation by said crankshaft and having a plurality of circumferentially spaced magnetic poles of sequentially alternating north-south polarity defining a plurality of north-south pole borders spaced by the width of said poles, and comprising a pole reversed out of the sequence to provide a pole of one polarity type between adjacent poles of said one polarity type, eliminating two of said pole borders;

a first stator mounted to said engine and having a plurality of poles for magnetic flux coupling with said permanent magnet rotor poles and having first sensor coil means for sensing variations in magnetic flux as said north-south rotor pole borders pass said poles of said first stator during crankshaft rotation;

a second stator mounted to said engine and having a pair of poles and having second sensor coil means for sensing magnetic flux coupling between said rotor poles and said poles of said second stator, said second sensor coil means outputting a signal having a first characteristic when said sequence of rotor poles is passing said poles of said second stator, and having a second characteristic when said reversed rotor pole is passing said poles of said second stator.

2. The invention according to claim 1 wherein said rotor poles are equally spaced, and wherein said first stator comprises an annular member closely radially spaced from said rotor and having a plurality of equally circumferentially spaced said poles.

3. The invention according to claim 2 wherein said plurality of poles of said first stator are spaced by an odd number of rotor pole widths, and wherein said pair of poles of said second stator are spaced by an even number of rotor pole widths.

4. The invention according to claim 2 wherein said rotor has a given number X of said poles, including said reversed pole, and wherein said first stator has X poles radially aligned with said rotor poles.

5. The invention according to claim 2 wherein:
said first stator comprises an annular ring concentric to said rotor and having distal side faces spaced axially from each other along a direction parallel to the axis of rotation of said crankshaft and rotor;
said first side face has a plurality of fingers extending radially inwardly toward said rotor and providing half of said poles of said first stator;
said second side face has a plurality of fingers extending radially inwardly toward said rotor and providing the other half of said poles of said first stator.

6. The invention according to claim 5 wherein said fingers of said first side face are spaced by an even number of rotor pole widths, and wherein said fingers of said second side face are spaced by an even number of rotor pole widths and offset from said fingers of said first side face by an odd number of rotor pole widths.

7. The invention according to claim 6 wherein said first sensor coil means is circumferentially wound between said side faces.

8. The invention according to claim 7 wherein said first sensor coil means includes a bobbin, and wherein said fingers of said first side face extend radially inwardly toward said rotor and then axially toward said second side face and engage said bobbin, and wherein said fingers of said second side face extend radially inwardly toward said rotor and then axially toward said first side face and engage said bobbin.

9. The invention according to claim 8 wherein said axial portions of said fingers of said first side face are spaced from said axial portions of said fingers of said second side face by one rotor pole width.

10. A crankshaft angle sensing system for an internal combustion engine having a rotary crankshaft comprising:
an annular permanent magnet rotor mounted around and fixed to said crankshaft for rotation therewith, said rotor having a given axial dimension extending parallel to the axis of rotation of said crankshaft, said rotor having a plurality of circumferentially spaced magnetic poles of sequentially alternating north-south polarity type defining a plurality of north-south pole borders spaced by the width of said poles, each pole defining an axially extending strip along said annular rotor and subtending an arc of given angular rotation of said crankshaft, and comprising a pole reversed out of the alternating sequence to provide a pole of one polarity type between adjacent poles of said one polarity type, eliminating two of said pole borders;

a first stator mounted to said engine and comprising an annular ring concentric to said rotor along a portion of the axial extent of said rotor poles, said first stator having a plurality of poles for magnetic flux coupling with said permanent magnet rotor poles and having first sensor coil means for sensing variations in magnetic flux as said north-south rotor pole borders pass said poles of said first stator for sensing the angular degree of rotation of said crankshaft;

a second stator mounted to said engine and axially spaced from said first stator and having a pair of poles radially aligned with said rotor along another portion of said axial extent of said rotor axially spaced from said first mentioned portion, and comprising second sensor coil means for sensing magnetic flux coupling between said rotor poles and said pair of poles of said second stator, said second sensor coil means outputting a signal having a first characteristic when said sequence of rotor poles is passing said poles of said second stator, and having a second characteristic when said reversed rotor pole is passing said poles of said second stator.

11. The invention according to claim 10 wherein:
said first sensor coil means comprises a coil wound circumferentially around said annular ring of said first stator;
said second stator comprises a U-shaped member having a pair of legs having first ends forming said pair of poles of said second stator proximate said rotor, said legs having second ends joined by a bight radially spaced outwardly from said rotor, and wherein said second sensor coil means comprises a coil wound around said bight.

12. A crankshaft angle sensing system for an internal combustion engine having a rotary crankshaft comprising:
an annular permanent magnet rotor mounted and fixed to said crankshaft for rotation therewith and having a plurality of circumferentially spaced magnetic poles of sequentially alternating north-south polarity type defining a plurality of north-south pole borders spaced by the width of said poles, and comprising a pole reversed out of the alternating sequence to provide a pole of one polarity type between adjacent poles of said one polarity type, eliminating two of said pole borders;

a first stator mounted to said engine and having a plurality of poles for magnetic flux coupling with said permanent magnet rotor poles and having first sensor coil means for sensing variations in magnetic flux as said north-south rotor pole borders pass said poles of said first stator during crankshaft rotation and outputting an analog sinusoidal induced voltage waveform having a plurality of voltage polarity reversals caused by magnet flux polarity reversals of said rotor pole borders, each polarity reversal appearing after a given angular degree of crankshaft rotation;

a second stator mounted to said engine and having a pair of poles for magnetic flux coupling with said permanent magnet rotor poles, and having second sensor coil means for sensing magnetic flux coupling and outputting a signal having a first characteristic when said alternating sequence of rotor poles is passing said poles of said second stator, and having a second characteristic when said reversed rotor pole is passing said poles of said second stator.

13. The invention according to claim 12 comprising:
first circuit means responsive to said first sensor coil means and outputting a plurality of digital timing angle pulses during each crankshaft revolution with ANGLE-defining edges corresponding to fixed angular increments of rotation of said crankshaft;

second circuit means responsive to said second sensor coil means and outputting a digital reversed pole pulse with an advance warning REFERENCE ANGLE-defining edge for each crankshaft revolution in response to said second characteristic.

14. The invention according to claim 13 comprising third circuit means responsive to said first and second circuit means and outputting a digital reference pulse dependent upon said reversed pole pulse but substantially synchronized to a selected one of said timing angle pulses.

15. The invention according to claim 14 comprising frequency sensitive switch means connected between said first circuit means and said third circuit means and responsive to the frequency of said timing angle pulses and enabling said digital reference output pulse when crankshaft speed is above a given speed.

16. The invention according to claim 14 wherein said third circuit means comprises a first flip flop having an input from said second circuit means, and a second flip flop having an input from said first circuit means and an input from said first flip flop, said second flip flop having an output providing said reference pulse.

17. The invention according to claim 16 wherein said first flip flop has a reset input, and wherein said reference pulse is also provided to said reset input of said first flip flop to reset said first flip flop.

18. The invention according to claim 17 wherein said first circuit means comprises a squaring amplifier coupled to said first sensor coil means, and wherein said second circuit means comprises a comparator coupled to said second sensor coil means.

19. The invention according to claim 14 comprising miroprocessor means having an ANGLE input receiving said angle defining edges and having a REFERENCE input receiving said reference pulse, and wherein there are a given number N of said angle defining edges during each said crankshaft revolution, and wherein said microprocessor means includes counter means counting said angle defining edges, wherein said microprocessor means responds to said reference pulse to begin counting said angle defining edges and responds to the (N−1)th said angle defining edge to stop said counting, such that said counter means counts N−1 said angle defining edges following said reference pulse and then ignores the Nth said angle defining edge and then begins recounting said angle defining edges following said reference pulse.

* * * * *